United States Patent
Ehrlich et al.

(10) Patent No.: US 10,045,523 B2
(45) Date of Patent: Aug. 14, 2018

(54) BAITING METHOD AND APPARATUS FOR PEST CONTROL

(71) Applicant: Ninox Robotics Pty Ltd, Hornsby (AU)

(72) Inventors: Marcus Ehrlich, Paddington (AU); Daniel Vogelnest, Paddington (AU)

(73) Assignee: Ninox Robotics PTY LTD, New South Wales (AU)

( * ) Notice: Subject to any disclaimer, the term of this patent is extended or adjusted under 35 U.S.C. 154(b) by 129 days.

(21) Appl. No.: 15/302,621

(22) PCT Filed: Apr. 10, 2015

(86) PCT No.: PCT/AU2015/050165
§ 371 (c)(1),
(2) Date: Oct. 7, 2016

(87) PCT Pub. No.: WO2015/154148
PCT Pub. Date: Oct. 15, 2015

(65) Prior Publication Data
US 2017/0027155 A1    Feb. 2, 2017

(30) Foreign Application Priority Data
Apr. 10, 2014  (AU) .................. 2014901315

(51) Int. Cl.
*G06K 9/00*       (2006.01)
*A01M 25/00*      (2006.01)
(Continued)

(52) U.S. Cl.
CPC ........ *A01M 25/006* (2013.01); *A01M 31/002* (2013.01); *B64C 39/024* (2013.01);
(Continued)

(58) Field of Classification Search
None
See application file for complete search history.

(56) References Cited

U.S. PATENT DOCUMENTS 7,501,979 B1   3/2009  Guice et al.
2005/0025357 A1  2/2005  Landwehr et al.
(Continued)

FOREIGN PATENT DOCUMENTS

CN        203528826 U    4/2014

OTHER PUBLICATIONS

International Preliminary Reoprt on Patentability issued by the Australian Patent Office for International Application No. PCT/AU2015/050165, dated Aug. 3, 2016 (15 pages).
(Continued)

*Primary Examiner* — Stephen Coleman
(74) *Attorney, Agent, or Firm* — Finnegan, Henderson, Farabow, Garrett & Dunner LLP

(57) ABSTRACT

A system for carrying out pest baiting, comprises an unmanned aerial vehicle (UAV) which is controllable to record image data over a predefined flight path, the image data being captured by an image recording device. A computer processing arrangement is operable to evaluate the recorded image data to determine pest related data associated with an animal species identified as a pest, and to subsequently determine a baiting program for eradication of the animal species based on the determined pest data.

22 Claims, 4 Drawing Sheets

(51) Int. Cl.
  *G06Q 50/02* (2012.01)
  *G01S 17/88* (2006.01)
  *G06K 9/32* (2006.01)
  *A01M 31/00* (2006.01)
  *B64C 39/02* (2006.01)
  *G01S 13/08* (2006.01)
  *G01S 17/08* (2006.01)
(52) U.S. Cl.
  CPC .............. *G01S 13/08* (2013.01); *G01S 17/08* (2013.01); *G01S 17/88* (2013.01); *G06K 9/0063* (2013.01); *G06K 9/3241* (2013.01); *G06Q 50/02* (2013.01); *B64C 2201/12* (2013.01); *B64C 2201/141* (2013.01)

(56)  References Cited

U.S. PATENT DOCUMENTS

| | | |
|---|---|---|
| 2011/0084162 A1 | 4/2011 | Goossen |
| 2013/0156271 A1 | 6/2013 | Cimino |
| 2013/0257641 A1 | 10/2013 | Ronning |
| 2014/0311014 A1 | 10/2014 | Feugier |

OTHER PUBLICATIONS

International Search Report issued by the Australian Patent Office for International Application No. PCT/AU2015/050165, dated Jun. 18, 2015 (3 pages).
Further Examination Report in New Zealand Application No. 724720, dated Feb. 27, 2018.

BAITING METHOD AND APPARATUS FOR PEST CONTROL

CROSS-REFERENCE TO RELATED APPLICATIONS

This application is a national phase application of International Application No. PCT/AU2015/050165, filed Apr. 10, 2015, which claims priority to Australian Application No. 2014901315, filed Apr. 10, 2014. The contents of all of the above-mentioned applications are incorporated herein by reference in their entirety.

TECHNICAL FIELD

The present invention relates to an apparatus and method for delivering poisonous bait to invasive animal species in a targeted manner. Embodiments find particular application for delivering bait to invasive vertebrate species, such as rabbits, foxes, wild dogs, feral pigs and feral cats especially in (but not limited to) large, relatively inaccessible areas where manual baiting is impractical.

BACKGROUND TO THE INVENTION

The introduction of non-native animal species into an environment can have serious detrimental effects on native fauna and flora, as well as agriculture.

In Australia, for example, it is conservatively estimated that introduced vertebrate animals (e.g. foxes, rabbits, feral pigs, feral cats, etc.) cause approximately one billion dollars of lost productive capacity each year. The costs at an environmental level are impossible to quantify, however it is safe to say that introduced predators such as foxes, cats and wild dogs have directly contributed to the extinction of many of Australia's unique marsupial mammal species.

Numerous control techniques have been utilised by farmers and various bodies (both governmental and non-governmental organisations) in an attempt to address the invasive species problem. One technique which is generally regarded as being effective is to "bait" the invasive species with a substance that is poisonous to that species.

The most common way to carry out poisonous baiting is by hand. This typically involves initially surveying a problem area to identify a habitat of the invasive species and then delivering a suitable amount of poisonous bait in or around the habitat. However, a major disadvantage with such a technique is that it is particularly labour intensive and is not ideal in situations where the invasive species is known to travel over a wide area, such as the vast agricultural lands of Australia.

Another way of carrying out baiting which is more suited for agricultural applications involves the use of a piloted airplane or helicopter to carry out a baiting operation where baits are dropped indiscriminately over areas where pests are expected to be. These areas are often chosen based on incomplete ground tracking statistics, and educated guesswork. A major disadvantage with aerial baiting is that it is expensive (in time and bait volume), and can be harmful to native wildlife.

It would be advantageous if there was provided a cost effective method of carrying out baiting that is suitable for agricultural applications.

SUMMARY OF THE INVENTION

In a first aspect the present invention provides a method for controlling the population of an animal species identified as a pest, comprising the steps of: controlling an unmanned aerial vehicle (UAV) to record image data over a predefined flight path, the image data being captured by an image recording device; evaluating the recorded image data to determine pest related data associated with the animal species; and determining a baiting program involving the delivery of a bait which is poisonous to the animal species, based on the determined pest data.

In an embodiment the image data comprises multi-spectral image data.

In an embodiment the method further comprises recording spatial data over the predefined flight path and wherein the spatial data is additionally evaluated to determine the pest related data. In an embodiment the spatial data is captured by a LIDAR scanner.

In an embodiment the image recording device is operable to track movement of the identified animal species, based on detection thereof from the evaluated recorded image data.

In an embodiment the image recording device is mounted on a gimbal.

In an embodiment the pest related data comprises one or more regions in which the animal species and/or corresponding habitats were identified.

In an embodiment the pest related data comprises a predicted one or more regions for the animal species.

In an embodiment the pest related data further comprises a number of the identified animal species.

In an embodiment the baiting program comprises determining one or more bait locations for delivering the bait in the area of operation.

In an embodiment the bait location(s) corresponds to the location(s) in which the animal species was previously identified.

In an embodiment the bait location(s) corresponds to one or more predicted location(s) for the animal species at or shortly after the time of delivering the bait.

In an embodiment the baiting program comprises determining an amount of the bait for delivery based on the determined number of the animal species.

In an embodiment the method further comprises implementing an algorithm for determining the baiting program from the determined pest related data.

In an embodiment the algorithm is automatically implemented by a computer.

In an embodiment the method further comprises performing a computer implemented object recognition process for automatically identifying the animal species from the recorded image data. In an embodiment the computer implemented object recognition process comprises evaluating the image data to recognise features which are indicative of one or more invasive animal species. In an embodiment the method comprises the further step of carrying out a feature extraction process on the image data and whereby the extracted features are compared against a predefined feature set comprising features indicative of the one or more invasive animal species.

In an embodiment the UAV is automatically controlled to fly over the predefined flight path.

In an embodiment, after having flown of the predetermined flight path, the UAV is further controlled to fly to a base station where the image data is collected for evaluation.

In an embodiment the UAV is programmed to wirelessly communicate the image data to a base station while in operation.

In an embodiment the UAV is powered by a battery and wherein the UAV is controlled to return to the base for recharging the battery either at some predetermined time or in response to the battery levels falling below a predefined threshold.

In an embodiment the UAV is operable to automatically navigate changes in terrain for avoiding collision while operating over the flight path.

In an embodiment the method further comprises controlling a UAV to deliver the bait in accordance with the determined baiting program.

In an embodiment the UAV controlled to deliver the bait is the same UAV controlled to record the image data.

In accordance with a second aspect there is provided a system for carrying out pest baiting, comprising:
an unmanned aerial vehicle (UAV) which is controllable to record image data over a predefined flight path, the image data being captured by an image recording device;
a computer processing arrangement operable to evaluate the recorded image data to determine pest related data associated with an animal species identified as a pest; and the computer processing arrangement being further operable to determine a baiting program for eradication of the animal species based on the determined pest data.

In accordance with a third aspect there is provided an unmanned aerial vehicle comprising a bait delivery mechanism, the vehicle being programmable to operate in accordance with the method as described in accordance with the first aspect.

BRIEF DESCRIPTION OF THE DRAWINGS

An embodiment of the present invention will now be described, by way of example only, with reference to the accompanying drawings, in which.

DETAILED DESCRIPTION

Embodiments described herein relate to systems and methods for determining and implementing a baiting program to control the population of an invasive animal species, identified as a pest. As used herein the term "pest" will be understood as referring to any animal species that has reached a population that causes problems of an economic, social and/or environmental nature.

Figure 1:
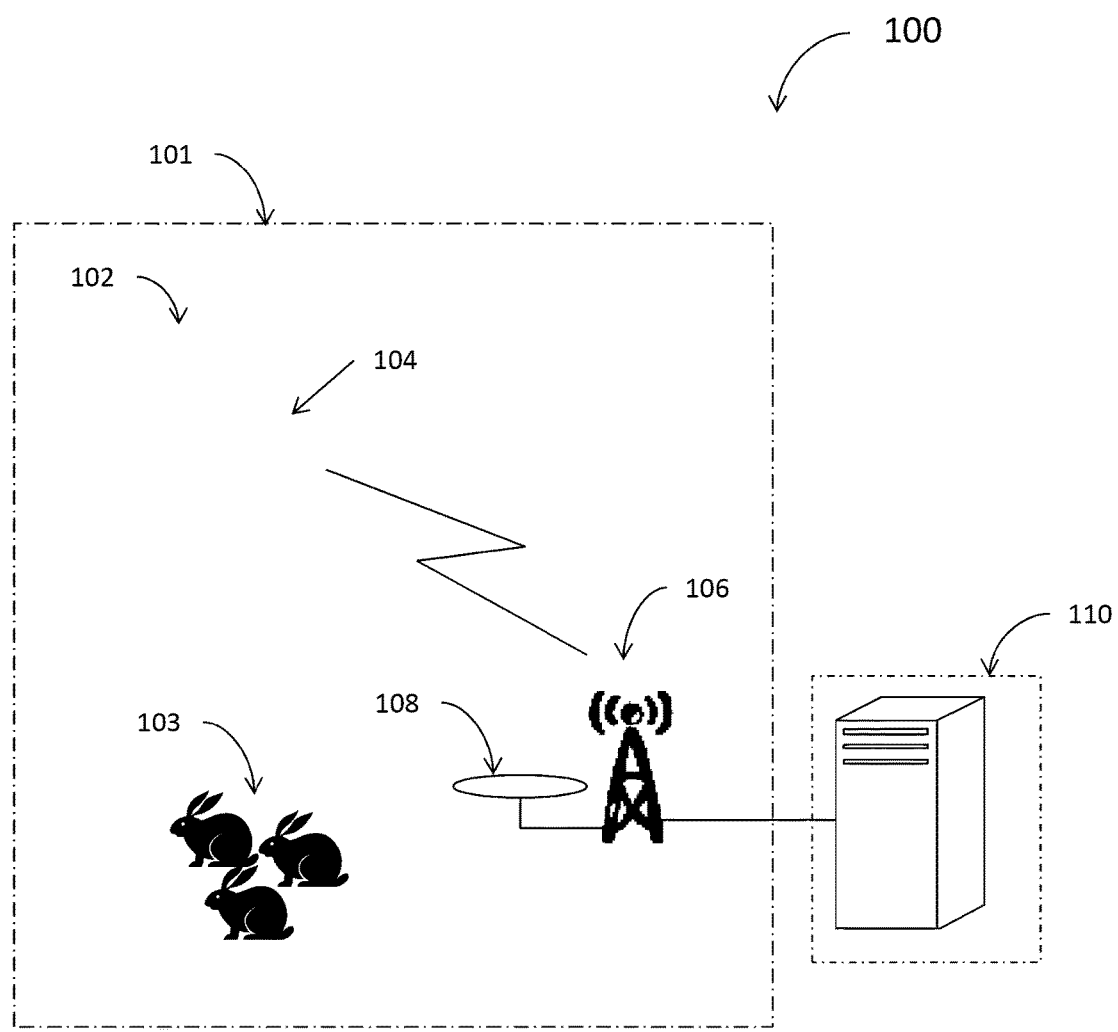
FIG. 1 is a schematic of a system for providing a targeted baiting program to control the population of a pest species in accordance with an embodiment.

With reference to FIG. 1, there is shown a system 100 for implementing a baiting program to control a targeted invasive animal species population 103 within a predefined area of operation (AOO) 101. The system 100 comprises an unmanned aerial vehicle (UAV) 102 which, according to the illustrated embodiment, is powered by a petrol or electric motor. It will also be understood that one or more fuel cells may be utilised for powering the UAV 102.

The UAV 102 includes an on-board computer 104 which provides the necessary instructions for flight control, based on program code stored in memory. In addition to providing flight control functions, the computer 104 is also operable to control various auxiliary systems, including controlling remote sensing devices and bait deployment motors and mechanisms as will be described in more detail in subsequent paragraphs.

The computer 104 is communicable with a flight control system 110 for uploading flight path and auxiliary control data and downloading recorded sensory data, as will be described in more detail in subsequent paragraphs. According to the illustrated embodiment, the flight control system 110 is located at a landing site 108 for the UAV 102. The UAV 102 is programmed to return to the landing site 108 when not in operation, for making communication with the flight control system 110 and refueling. In a particular embodiment this involves manually docking the UAV 102 into a structure that facilitates refueling, bait re-stocking, general maintenance and information transfer (e.g. using an Ethernet cable which connects the compute 104 to the flight system 110).

Also shown in FIG. 1 is a wireless antenna 106 which facilitates wireless communication between the computer 104 and flight system 110. Such wireless communication may be required for providing additional flight control instructions to the UAV 102 while in operation, as well as allowing the UAV 102 to relay information back to the flight system 110 for immediate processing. In an alternative embodiment, the wireless communication could be carried out via a satellite network or any other suitable wireless network configuration.

Further detail of the UAV 102 of one embodiment will now be described with reference to FIG. 2.

As previously discussed, the UAV 102 is specially configured for automated aerial bait deployment, which introduces complexities in load distribution management during flight. In this regard, in a particular embodiment the fuselage 201 and wingspan of the UAV 102 generally shown in FIG. 2 are both relatively large to support the bait payload and achieve a suitable lift. It will also be apparent from the following description that UAV 102 employs a modular design to facilitate ease of use, maintenance and construction.

Figure 2:
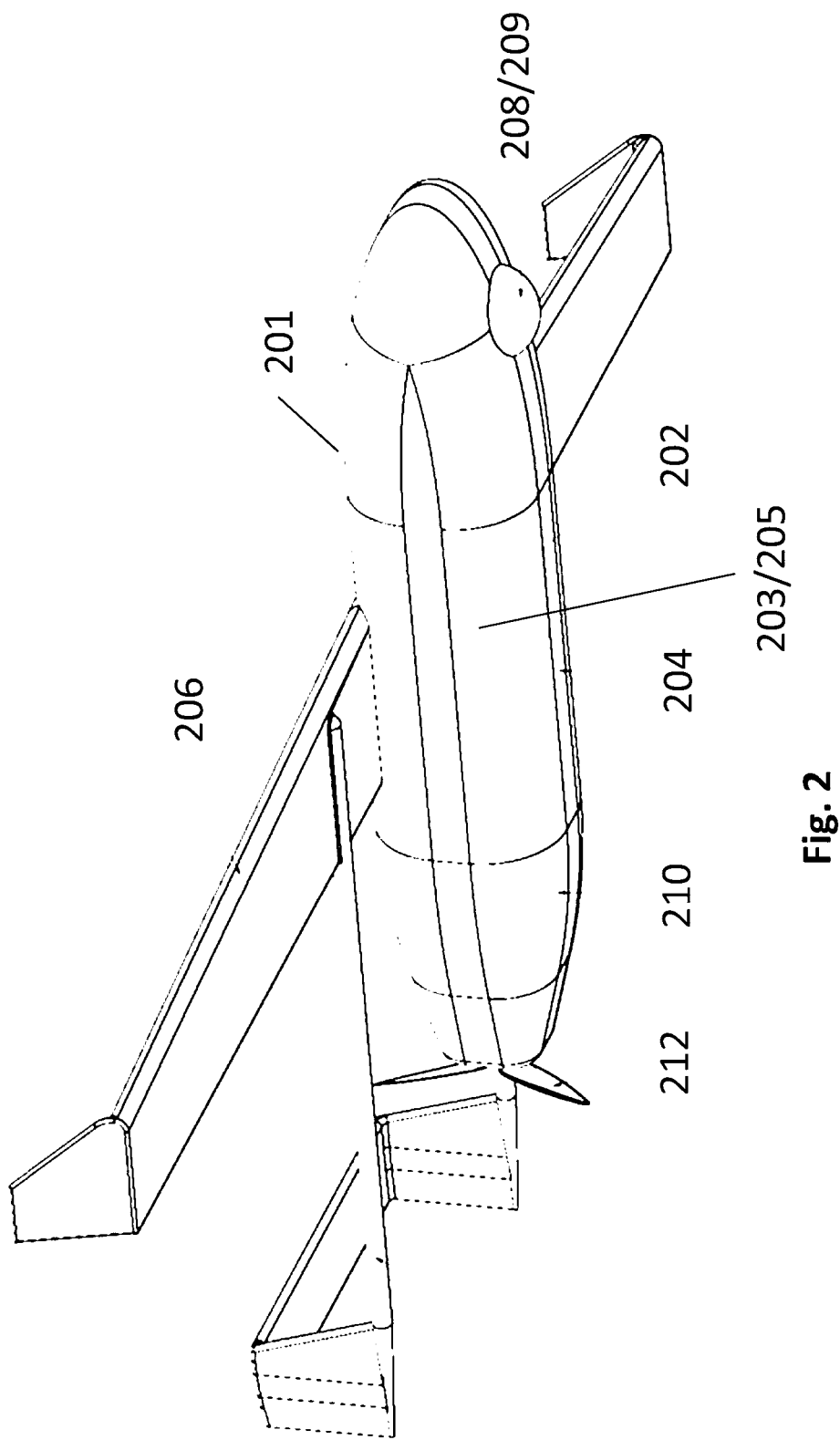
FIG. 2 is a schematic showing further detail of the UAV shown in FIG. 1.

In more detail, the UAV 102 of FIG. 2 includes a payload bay 203 located behind a payload access panel 202 which provides quick and easy access to the payload bay 203. The payload bay 203 is separated into several vertically aligned compartments which can, if desired, contain multiple bait varieties. The compartments are designed to allow for gravity and/or actuated feeding of bait into a bait deployment mechanism 205 located behind the access panel. According to the embodiment described herein, the bait deployment mechanism 205 comprises a wheel, latch or similar feed mechanism powered by an electric motor (under the control of the computer 104) which is arranged to collect a single bait, or bait cluster, from a feed point and deliver the feed to the base of payload bay, at which point it is pushed through a bait deployment flap 204 to free fall to a target ground location. The flap 204 essentially operates to maintain aerodynamic efficiency, increase control of drop location and prevent bait impact with the propellers. An engine 210 powers a prop 212 for propulsion.

Sensors may be utilised to feedback information to the computer 104 about remaining bait distribution and also to detect unsuccessful feeds/deployments for additional system control. In a particular embodiment, the payload bay compartments may be strategically monitored and emptied to maintain the UAV's centre of gravity and hence balance as fuel and bait are deployed.

The wing 206 of the UAV 102 is located slightly behind the centre of the fuselage 201 to allow for an appropriate load distribution. A shoulder wing configuration is used to allow for an increased payload volume and to provide unobstructed access to the payload bay 203.

In an alternative configuration to that shown in FIG. 2, the UAV may be configured for use with a parafoil (i.e. instead of requiring "fixed" wings). The parafoil may advantageously provide increased weight bearing capacity relative to the UAV shown in FIG. 2. It will be understood that the actual design of the UAV may vary depending on the desired implementation.

As previously discussed, the UAV 102 includes one or more remote sensing devices. According to embodiments described herein, the UAV 102 implements a combination of image and spatial data sensing devices (although it will be understood that the UAV could implement only a single type of sensor, depending on the desired implementation). The image sensing devices take the form of multispectral imaging cameras 208 which are mounted to the fuselage 201 by way of a stabilised gimbal 209. The cameras 208 are located toward the front of the UAV 102 for increased field of view and load distribution. The gimbal 209 stabilises the cameras 208 and facilitates actuated pan/tilt directionality and zoom control. Processing circuitry implemented by the computer 104 may interpret the imagery acquired and provide real-time pan/tile/zoom control commands in response to determining predefined control triggers (e.g. determining an object or area of interest, such as a potential habitat or suspected targeted animal species). According to the illustrated embodiment the cameras 208 comprise a thermographic sensor and visible spectrum sensor for covering a frequency spectrum between far-infrared and near ultraviolet. A distance sensing device in the form of a LIDAR scanner 211 is also provided for recording spatial data that can additionally be combined with the other sensory data to produce image models with the extra dimension of depth. The machine learning algorithm described in more detail in subsequent paragraphs can increase accuracy of results when utilising this image model information. For example, the depth information would assist the machine learning process in identifying and differentiating habitat types based on the height of trees within.

Figure 3:
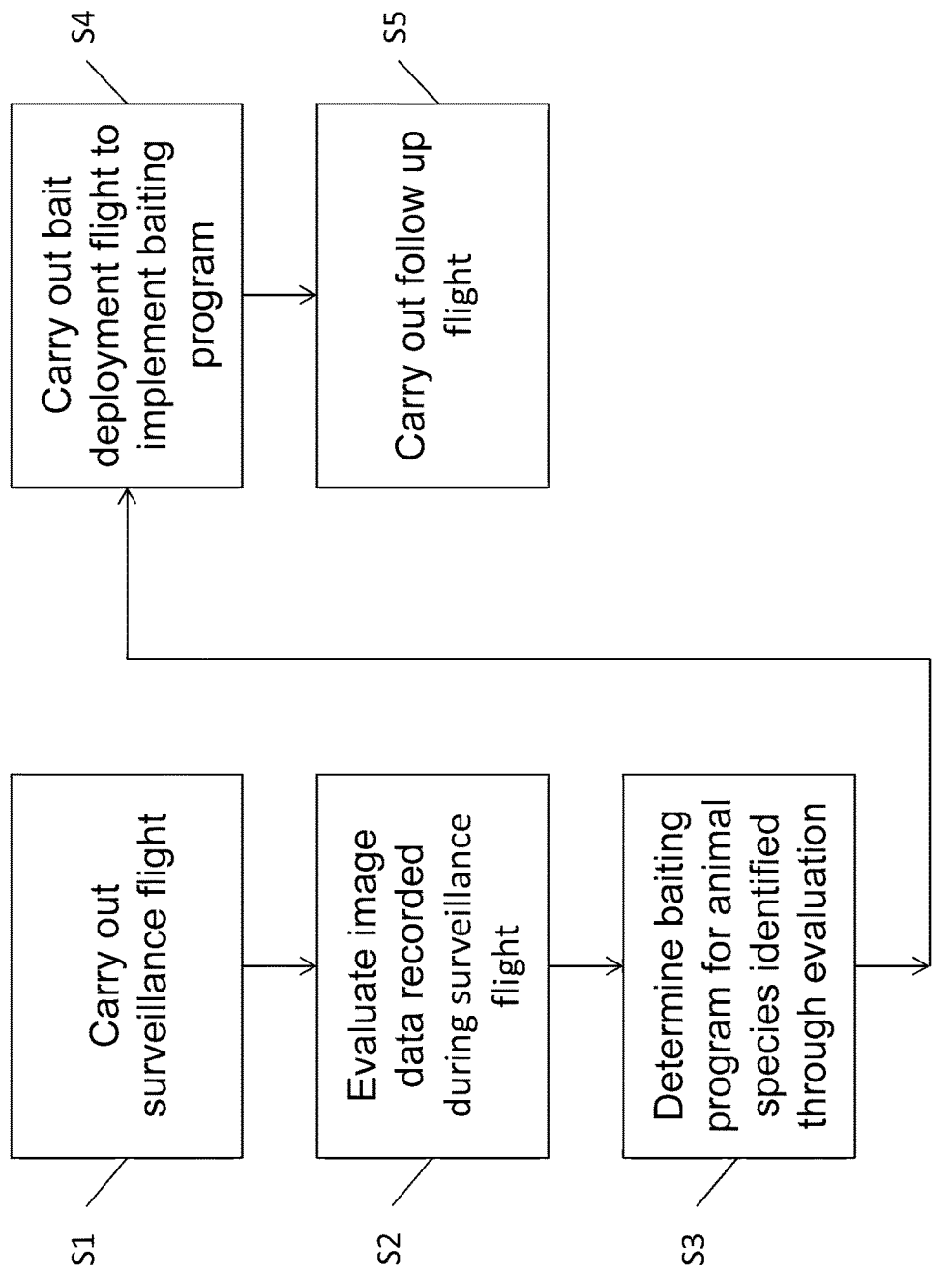
FIG. 3 is a process flow for performing a baiting program, in accordance with an embodiment.

A basic process flow for determining a baiting program implemented by the UAV 102 will now be described with additional reference to FIG. 3. At step S1, the UAV 102 is controlled to carry out a "surveillance flight", based on flight data uploaded by the flight control system 110. This involves controlling the UAV 102 to fly over a predefined flight path within the AOO 101 during which image and spatial data is recorded by the sensing devices 208/211. In a particular embodiment, AOO 101 coordinates are manually entered into the flight control system 110 which subsequently generates a surveillance flight path that suitably covers the AOO 101 (i.e. based on a known field of view for the cameras 208 and any environmental and/or geographical mapping considerations).

At step S2, the recorded data is communicated to the flight control system 110 for subsequent processing and interpretation. In a particular embodiment, and as will be described in more detail in subsequent paragraphs, this involves employing a combination of computer vision and machine learning processes to recognise predefined features that are useful for determining an appropriate baiting program for the targeted animal species, including instances of the targeted species, as well as potential habitats for those targeted species. The useful features may also include non-target animal species (such as wild farmed, and domestic animals), terrain types and landmarks (such as distinct or man-made landmarks) which may be used for autonomous mapping and path planning, as discussed in subsequent paragraphs. The recognised features are then logged for determining a suitable baiting program (step S3). In a particular embodiment the location of the recognised features are determined by correlating times that they occurred against the flight path data for the UAV 102.

At step S4, the UAV 102 is autonomously controlled to carry out a "deployment flight" based on the baiting program determined in step S3. The baiting program involves determining at least one of a type of bait, location of bait and amount of bait to deploy along a calculated flight path.

At step S5, after some predefined period of time, the UAV 102 may optionally be controlled to carry out a "follow up flight" to judge the effectiveness of the baiting program, utilising the same process as for the first survey flight.

Further Detail of the Flight Control System

Figure 4:
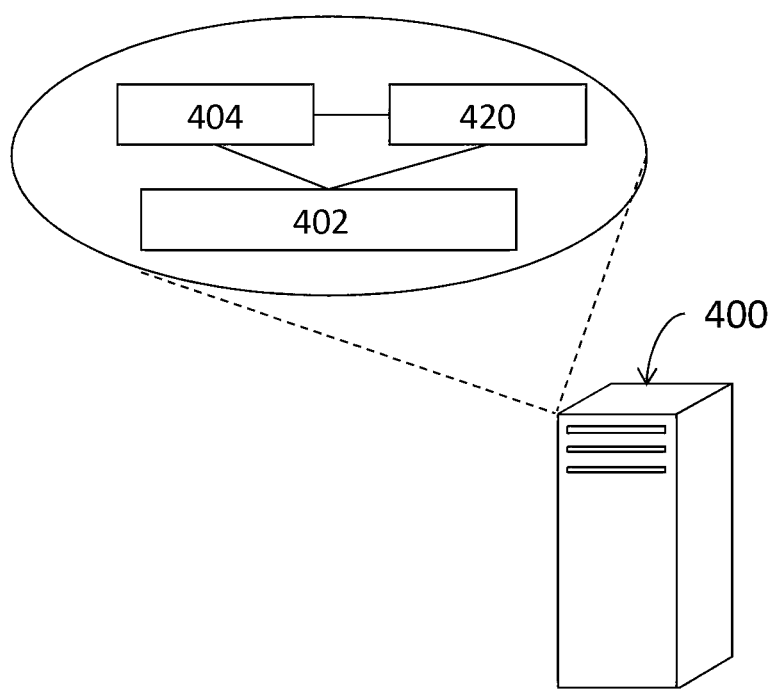
FIG. 4 is a schematic of a flight controller, in accordance with an embodiment.

With further reference to FIG. 4, there is shown an electronic controller 400 implemented by the flight control system 110. The controller 400 includes a processor 402 which is operable to determine a baiting program for implementing by the on-board computer 104 of the UAV 102. The controller 400 includes suitable communications hardware and software for communicating with the on-board computer 104 (either by direct electrical connection, wirelessly via base station 106, etc.). It will be understood that the communications could be effected by any suitable technique (e.g. cable, via a mobile communications network, etc.) depending only on the desired implementation.

Herein the term "processor" is used to refer generically to any device that can process instructions based on programmed code and may include: a microprocessor, microcontroller, programmable logic device or other computational device, a general purpose computer (e.g. a PC) or a server.

It will be apparent that the processor 402 implements a program determination module 404 which is operable to execute a feature identification and baiting determination program, based on program code stored in memory 420. The module 404 is also operable to generate flight path data (i.e. executable by the UAV computer 104 to carry out the surveillance and bait deployment flights), as well as to generate auxiliary system and baiting control programs for controlling operation of the UAV cameras and bait deployment mechanism in a desired manner.

In more detail the feature identification and baiting determination program is configured to perform the following steps:

(a) carry out image processing on the recorded image data to form more usable image types (e.g. noise reduction, conversion to greyscale, line detection, image stitching and fusion of each camera's imagery);

(b) perform a mixture of computer vision and machine learning functions to detect useful features in the processed image data including targeted pest species and habitats, terrain types, non-target animal species, man-made structures etc. With regards the computer vision function, the process may involve:

feature extraction (e.g. to extract lines, circles or more complex shapes from the data);

pattern matching to identify objects that are relevant for determining the baiting program. In a particular embodiment this involves comparing the extracted features against a feature set (stored in memory 420) of known objects, such as the outline of a particular type of targeted animal species, habitat type, etc.; and optical flow analysis for detecting a motion of relevant identified object (e.g. targeted animal species)

With regards to the machine learning function, each time the process detects 'something' that does not correspond to an object already characterized in the feature set, an operator tells the program what that feature is thereby allowing it to learn to subsequently find and classify similar objects. In time, the program 'learns' how to accurately detect, and require limited supervision for uncertain objects.

(c) determine an optimal baiting pattern for targeting the targeted animal species, including determining bait drop locations and amounts;

(d) generate optimal baiting flight paths which minimise flight time to reach determined bait drop locations. The flight information may be illustrated on a map model of the AOO 101, where flight paths can be adjusted manually if necessary (e.g. if an operator does not want bait in a certain are for some reason)

In a particular embodiment, the feature identification and baiting determination program is additionally operable to evaluate the output of the LIDAR scanner 211 which can be combined with the other sensory data to produce models with the extra dimension of depth. The machine learning algorithm described above can increase accuracy of results when utilising this information.

In a particular embodiment, the feature identification and baiting determination program is programmed to set a bait drop location which corresponds to a determined location of the targeted animal species (i.e. established from the image data, as afore-described).

In an alternative embodiment the bait drop location is determined to correspond to a predicted location or area for the targeted animal species. By way of example, the predicted location may be determined based on recognised terrain types or habitats that the targeted animal species is known to inhabit. Alternatively, the predicted location may be determined based on a predicted movement of the targeted animal species. By way of example, the prediction may be determined through an analysis of a sample sequence of images captured by the image sensors. More specifically, an optical flow analysis may be implemented by the program to calculate a velocity of the recognised targeted animal species in the image sequence. The velocity can then be used to predict a location of the targeted animal species at an estimated bait drop time. The program will also take into consideration actual animal behaviours by providing manually tracked animal locations to the machine learning system during development, where it will inherently adjust its predictions increase accuracy.

In a particular embodiment, the feature identification and baiting determination program is configured to determine a suitable bait drop pattern which may take into consideration statistical distribution mathematics and weightings applicable to recognised terrains, habitat types and identified or predicted target species locations.

Worked Example

The following is an example of how the computer vision and machine learning processes (implemented by the feature extraction and bait determination module) result in feature identification and determination of baiting plans. For this example, consider a situation where a segment of the recorded sensor data (in this example being captured by image sensors as afore-described) represents the reality of a fox travelling north in a lightly wooded area. There is a small lake several kilometers north-west with dense scrub surrounding it. The UAV is set on a sweeping grid flight path that covers the entire area of interest. The camera system may occasionally zoom in and out to acquire more detail, or see a wider area (as required for each specific environment).

1. The recorded image data is pre-processed to reduce noise.
2. Basic features are extracted from the image data, such as lines, blobs, specific colours and any other desired features. In this specific example, the blob of heat from the fox is filtered from the background heat to produce data which can be visualized and interpreted as a pure black image with a white blob corresponding to the fox's location. The shade of green detected in the trees reflects the specific habitats.
2. Pattern matching is then carried out for the extracted features, comparing the sensor data to known characteristics of importance (i.e. stored in the feature set). In this case the outline of the heat blob matches the generic shape of a fox to a degree that is higher than all other shapes in the sensor data.
3. Optical flow techniques are subsequently applied to analyse the velocity of areas in the sensory data over multiple instances of time. In this example, the area where the fox is detected to be moving north, while the surroundings have minimal changes in position (i.e. branches in the wind).
4. The afore-described image information is delivered to the machine learning function (which includes one or more appropriate algorithms), which has already been trained to use these forms of data. In this example, the algorithm produces results saying that there is a fox at a location closely matching reality, and that it is currently moving north. It predicts a couple of likely locations nearby that the fox is likely to frequently visit (i.e. that the algorithm outputs based on prior learned inputs), one of which is near the small lake. It may have predicted this based on the training data it was supplied with during development, where foxes where frequently seen near water sources such as these.
5. The predicted locations of frequent visits are collated and a baiting program is formed. Some predicted locations may have been detected as less likely and are discarded to minimise bait wastage. The baiting locations are connected to form a flight path of minimum flight time, and the bait deploying UAV 102 is launched to follow accordingly. The UAV 102 approaches the lake, the baiting mechanism 205 is automatically triggered shortly in advance to account for its initial velocity, and an appropriate bait is deployed. The fox does visit the lake the next day, and consumes the bait that was dropped.

Accordingly, from the above, it can be seen that embodiments of the invention have at least one of the following advantages:

Improved Detection

Cameras 208 utilised for detection of species/habitats are vastly superior to the use of the human eye. Currently, rangers and farmers rely on spotting animals via human sight from aerial platforms. The human eye is highly fallible, with lapses in attention and limited field of view a primary cause of missing key features. Other methods, such as footprint based tracking provide incomplete data as it is impossible to monitor huge areas. The use of image and spatial data sensing devices (and particularly multi-spectral cameras) allow targets to be spotted through terrain features and irrespective of natural camouflage. Furthermore, the UAS equipped with this system is "tireless"—as long as it is flying and powered it will never stop "looking".

Reach and Thoroughness

Conventional forms of baiting and detection are done on an ad-hoc basis. Rangers tend to ask farmers where they have incidentally spotted certain invasive pests during the course of their daily duties. Embodiments described herein will cover an entire area of operation and do so with a precision not currently available. Irrespective of the terrain, the system will be able to monitor an entire AOO and aerially deploy baits.

Currently, baits are laid by guesswork due to the inability of farmers to thoroughly check their substantial land holdings and for lack of an effective and affordable observational platform. The improved detection offered by the proposed embodiments, coupled with the ability to cover any terrain allows for a more thorough and targeted baiting program tailored to the specific requirements of every area of operation, rather than simply laying baits in a random or equidistant manner—which represents the present situation.

Endurance

The afore-described system has the ability to be deployed for hours at a time, covering vast areas without need for a manned pilot.

Affordability

The afore-described system will be substantially less expensive than the current use of both helicopters and airplanes for the purposes of aerial detection and baiting.

Accuracy and Efficacy

Due to the sophisticated detection capabilities, the tailored designed baiting programs and the inherit ability of a UAV to deploy a payload, the system will provide substantially increased efficacy in the use of baits to go where they are needed.

Although the invention has been described with reference to the present embodiments, it will be understood by those skilled in the art that alterations, changes and improvements may be made and equivalents may be substituted for the elements thereof and steps thereof without departing from the scope of the invention. Further, many modifications may be made to adapt the invention to a particular situation without departing from the central scope thereof. Such alterations, changes, modifications and improvements, though not expressly described above, are nevertheless intended and implied to be within the scope and spirit of the invention. The above described embodiments are therefore not to be taken as being limiting in any respects.

Any reference to prior art contained herein is not to be taken as an admission that the information is common general knowledge of the skilled addressee in Australia or elsewhere.

It will be understood that different UAVs may be utilised to carry out the different flights described above. For example, a UAV specifically designed for surveillance could be deployed for the surveillance flights, while a UAV tailored for bait deployment may be deployed for carrying out the bait deployment flight.

Also, in a particular embodiment, two surveillance flights may be carried out before performing bait deployment. A first of the surveillance flights may aim to cover the entire AOO 101, while a subsequent surveillance flight may be carried out to focus on any features identified from the image data recorded for the first flight as being related to habitats and/or pest species. The image data resulting from the subsequent surveillance flight may then be evaluated for determining the baiting program. In an embodiment the feature extraction and bait determination program could be manually determined (e.g. based on a visual inspection of models output by the image sensors and an understanding of the targeted species habits).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for controlling the population of an animal species identified as a pest, comprising the steps of:
   controlling an unmanned aerial vehicle (UAV) to record image data over a predefined flight path, the image data being captured by an image recording device;
   inputting the image data into an image processing apparatus which is programmed to automatically recognise one or more features that are predefined as being relevant for baiting the animal species,
   implementing a computer algorithm that is configured to determine a baiting program comprising one or more baiting parameters based on the recognised features, the parameters comprising at least one of flight path, bait type, bait amount and bait location(s) for the delivery of a bait which is poisonous to the animal species; and
   implementing the baiting program.

2. A method in accordance with claim 1, wherein implementing the baiting program comprises controlling a UAV to deliver the bait in accordance with the determined baiting program.

3. A non-transitory computer readable medium storing computer program code comprising at least one instruction which, when implemented by a computing system, is operable to carry out the method in accordance with claim 1.

4. A method in accordance with claim 1, further comprising recording spatial data over the predefined flight path and wherein the spatial data is additionally evaluated for feature recognition by the image processing apparatus.

5. A method in accordance with claim 4, wherein the spatial data is captured by at least one of a LIDAR and RADAR scanner.

6. A method in accordance with claim 1, wherein the image data comprises multi-spectral image data.

7. A method in accordance with claim 6, wherein the image recording device is operable to track movement of the identified animal species, based on detection thereof from the evaluated recorded image data.

8. A method in accordance with claim 6, wherein the image recording device is mounted on a gimbal which is in turn coupled to the UAV.

9. A method in accordance with claim 1, further comprising performing a feature extraction process on the recorded image data and comparing extracted features against a set of known useful features for recognition thereof.

10. A method in accordance with claim 9, wherein the set of known useful features comprise features indicative of at least one of the following objects: targeted pest species; targeted pest habitat; non-targeted pest species; terrain type; landmark.

11. A method in accordance with claim 9, further comprising implementing a machine learning process for recognition of unknown features.

12. A method in accordance with claim 1, wherein the UAV is automatically controlled to fly over the predefined flight path.

13. A method in accordance with claim 12, wherein the UAV is powered by a battery and wherein the UAV is controlled to return to the base for recharging the battery either at some predetermined time or in response to the battery levels falling below a predefined threshold.

14. A method in accordance with claim 12, wherein the UAV is operable to automatically navigate changes in terrain for avoiding collision while operating over the flight path.

15. A method in accordance with claim 12, wherein, after having flown of the predetermined flight path, the UAV is further controlled to fly to a base station where the image data is collected for evaluation.

16. A method in accordance with claim 15, wherein the UAV is programmed to wirelessly communicate the image data to a base station while in operation.

17. A method in accordance with claim 1, wherein the computer algorithm process the feature data to determine one or more regions in which the animal species and/or corresponding habitats for the animal species were identified.

18. A method in accordance with claim 17, wherein the computer algorithm process the feature data to determine an actual or predicted number of the identified animal species.

19. A method in accordance with claim 18, wherein the bait location(s) corresponds to region(s) in which the animal species was identified.

20. A method in accordance with claim 19, wherein the bait location(s) is an anticipated location for the animal species.

21. A method in accordance with claim 19, wherein the amount of the bait for delivery is based on the determined number of the animal species.

22. A system for carrying out pest baiting, comprising:
an unmanned aerial vehicle (UAV) which is controllable to record sensory data over a predefined flight path, the sensory data being captured by at least one of an image recording device and spatial data sensor;
an image processing apparatus for receiving the sensory data and which is programmed to automatically recognise one or more features that are predefined as being relevant for baiting the animal species; and
a computer processing arrangement implementing an algorithm that is configured to determine a baiting program comprising one or more baiting parameters based on the recognised features, the parameters comprising at least one of flight path, bait type, bait amount and bait location(s) for the delivery of a bait which is poisonous to the animal species.

* * * * *